Figure 1:
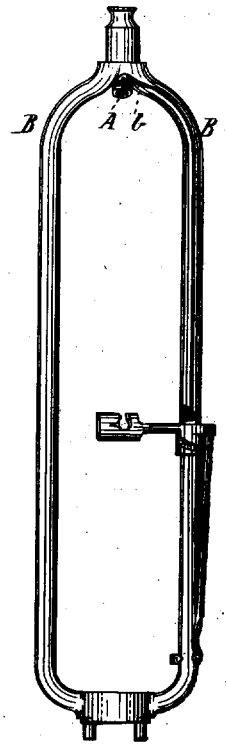

T. MAYOR.

Flyers for Roving and Spinning-Frames.

No. 5,295. Reissued Feb. 25, 1873.

Witnesses.

Edward C. Ames.

Peter F. Hughes.

Inventor.

Thomas Mayor.

UNITED STATES PATENT OFFICE.

THOMAS MAYOR, OF PROVIDENCE, RHODE ISLAND.

IMPROVEMENT IN FLIERS FOR ROVING AND SPINNING FRAMES.

Specification forming part of Letters Patent No. 110,260, dated December 20, 1870; reissue No. 5,295, dated February 25, 1873.

*To all whom it may concern:*

Be it known that I, THOMAS MAYOR, of the city and county of Providence, and State of Rhode Island, have invented a new and useful Improvement in Fliers; and I do hereby declare that the following specification, taken in connection with the drawing making a part of the same, is a full, clear, and exact description thereof.

Figure 2:
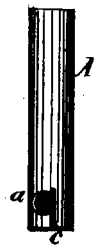
Figure 3:
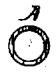

Figure 1 is a view of the flier with the improvement. Fig. 2 is a view of the device used with the flier, which constitutes the improvement. Fig. 3 is an end view of the same.

The invention which is the subject of this patent relates to an improvement in the devices for holding the roving or yarn by friction before the yarn enters the orifice of the side tube of the flier, to enable the yarn lying between the point where it is so held and the delivery-rollers to receive a uniform twist. Letters Patent for an improvement in fliers, involving the employment of devices for this end, were granted to me under date of March 21, 1865, and this invention is an improvement thereon. This invention consists in a means for applying friction to the roving at a point near the junction of the bows of the flier, at the lower extremity of the neck, whereby the portion of roving which is being twisted—that is to say, that portion which is held between the bite of the delivery-rolls and the point where the friction is applied—will occupy a line nearly coincident with the axis of the neck of the flier.

The most convenient way of employing the invention is exhibited in the drawing, especially in case fliers of old construction are to be supplied with the improvement; and it consists in extending the neck of the flier by means of a tube or equivalent device below the neck proper or point of junction with the bows, and furnishing such extended neck with a lateral orifice to allow the yarn to be conducted partially around the outside of such tube before being conducted into the side-delivery tube.

A, Fig. 2, is a tube, which may be of metal, glass, or other preferred material, and is to be inserted in the hollow axis of the neck of the flier, as seen at Fig. 1. Near the lower end of this tube an orifice, *a*, is made in its side, the location of which should be such as to give the necessary amount of friction upon the yarn in its passage to the side tube *b* in the bow B, to enable the twist to be properly put into that portion of the roving which is between the bite of the rolls and such friction-surface. For convenience in piecing up, a slit, *c*, should be cut from the bottom edge of the tube A to the orifice *a*.

Those practically acquainted with operating machinery for spinning yarn will understand the advantages of the improvement described.

It is well known that the twist is put into the yarn between the neck of the flier as ordinarily constructed and the drawing rolls. It is also as well known that the drawing or delivery rolls are placed above and more or less to the rear of the line of fliers in the frame. By way of example, it will be presumed that a flier be in use having a single aperture in the side of the neck. The roving extends from the bite of the rolls to the neck of the fliers, passes through the said aperture partially around the neck, thence to the mouth of the flier-tubes.

It is evident that the distance between the "bite" of the rolls and the inside edges of the neck of the flier varies while the flier is in rotation to the extent of its inside diameter, so that when the aperture be on the side furthest from the rolls the roving is taut, and when, by the revolution of the flier, the aperture is brought to the side adjacent to the rolls, the roving is slackened, the difference between the length of the roving under the two conditions being about equal to the diameter of the inside of the neck of the flier. This alternate tightening and loosening of the roving as the flier revolves gives a certain wabbling motion to the yarn or roving, and is exhibited in the appearance of a "mazy cone," the base of which is at the neck of the flier and the apex at the bite of the rolls. With my improvement there is no such alternating, as the roving is always in a direct line from the bite of the rolls to that inside edge of the tube in the neck of the flier which is adjacent to the rolls, therefore there is a greater degree of regularity, and more firmness to the twist given by my improved flier than by any other kind known to me.

It will also be readily understood that the neck of the tube constitutes an intermediate frictional point of contact with the yarn between the bite of the rolls and the frictional contact at the aperture near the lower end of the tube; therefore between the said delivery-aperture and the rolls there exists two different qualities or degrees of twist, that portion of the yarn between the said aperture and the neck of the tube being more firmly twisted than that portion between the neck of the flier and the rolls, and it is owing to this fact that I am enabled with my improved flier not only to obtain a superior degree of twist, but to wind the roving or yarn with greater solidity upon the bobbin than has, as I believe, been heretofore accomplished with any of the fliers in general use. Beside this, the operator is no more embarrassed in mending broken ends than in the use of fliers of old construction, not having the frictional application.

It is quite obvious that devices which will perform all the functions of the extended tube described can be used as a substitute therefor—as, for example, a wire with a hooked end or split leading eye can be attached to the under side of the neck of the flier, and effect substantially the same result when the yarn is made to drag over its surface in being led to the delivery-tube. Some advantage would exist in this device over the tube described, from the fact that the wire could be so shaped as to cause the yarn while twisting to stand in a line almost coincident with the axis of the neck of the flier.

What I claim as my invention, and desire to secure by Letters Patent, is—

That improvement in the construction of fliers which consists in the combination of the hollow tube A, or its equivalent, formed through the whole length of the axis of the neck of the flier, a friction-surface, *a*, located at or near the junction of the bows B B with the flier's neck, and the side-delivery tube *b* in one of the bows, substantially as described.

THOMAS MAYOR.

Witnesses:
C. DONHOE,
C. PARNELL.